(12) United States Patent
Folting et al.

(10) Patent No.: US 9,852,121 B2
(45) Date of Patent: *Dec. 26, 2017

(54) AUTOMATIC RELATIONSHIP DETECTION FOR SPREADSHEET DATA ITEMS

(71) Applicant: MICROSOFT TECHNOLOGY LICENSING, LLC, Redmond, WA (US)

(72) Inventors: Allan Folting, Redmond, WA (US); Stephen Van de Walker Handy, Bremerton, WA (US); Diego M. Oppenheimer, Seattle, WA (US); Anatoly V. Grabar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 284 days.

This patent is subject to a terminal disclaimer.

(21) Appl. No.: 14/666,259

(22) Filed: Mar. 23, 2015

(65) Prior Publication Data

US 2015/0193423 A1 Jul. 9, 2015

Related U.S. Application Data

(63) Continuation of application No. 13/252,450, filed on Oct. 4, 2011, now Pat. No. 8,990,675.

(51) Int. Cl.
*G06F 17/00* (2006.01)
*G06F 17/24* (2006.01)
(Continued)

(52) U.S. Cl.
CPC .............. *G06F 17/246* (2013.01); *G06F 9/44* (2013.01); *G06F 17/30* (2013.01);
(Continued)

(58) Field of Classification Search
CPC ............................. G06F 17/245; G06F 17/246
See application file for complete search history.

(56) References Cited

U.S. PATENT DOCUMENTS 5,272,628 A * 12/1993 Koss ..................... G06F 17/246
715/205
5,604,854 A * 2/1997 Glassey ................ G06F 17/246
345/419
(Continued)

FOREIGN PATENT DOCUMENTS

CN 1347529 A 5/2002
CN 101908040 A 12/2010
(Continued)

OTHER PUBLICATIONS

"Supplementary Search Report Issued in European Patent Application No. 12838636.4", dated Apr. 28, 2015, 6 Pages.
(Continued)

*Primary Examiner* — Laurie Ries
(74) *Attorney, Agent, or Firm* — Merchant & Gould

(57) ABSTRACT

A system for automatically detecting relationships in spreadsheet data is disclosed. The system may be configured to analyze data items in the spreadsheet to determine whether two or more data items are unrelated. If the two or more data items are unrelated, then the system may notify a user of a need to define the relationship, and automatically defines the relationship for the two or more data items, or suggests the relationship to the user.

20 Claims, 8 Drawing Sheets

(51) Int. Cl.
*G06Q 10/10* (2012.01)
*G06F 17/30* (2006.01)
*G06F 9/44* (2006.01)
*G06N 5/02* (2006.01)

(52) U.S. Cl.
CPC ......... *G06F 17/30292* (2013.01); *G06N 5/02* (2013.01); *G06Q 10/10* (2013.01)

(56) References Cited

U.S. PATENT DOCUMENTS

| | | | |
|---|---|---|---|
| 5,613,131 A * | 3/1997 | Moss | G06F 17/246 715/236 |
| 5,675,637 A | 10/1997 | Szlam | |
| 5,680,618 A | 10/1997 | Freund | |
| 5,689,703 A | 11/1997 | Atkinson et al. | |
| 5,729,730 A | 3/1998 | Wlaschin et al. | |
| 5,832,473 A | 11/1998 | Lee | |
| 5,835,916 A * | 11/1998 | Inaki | G06F 17/247 715/212 |
| 5,838,965 A | 11/1998 | Kavanagh et al. | |
| 5,856,826 A | 1/1999 | Craycroft | |
| 5,894,311 A | 4/1999 | Jackson | |
| 5,926,806 A * | 7/1999 | Marshall | G06F 17/30572 707/752 |
| 5,953,730 A | 9/1999 | Schawer | |
| 5,956,422 A | 9/1999 | Alam | |
| 6,026,392 A | 2/2000 | Kouchi et al. | |
| 6,078,924 A | 6/2000 | Ainsbury | |
| 6,112,199 A | 8/2000 | Nelson | |
| 6,128,626 A * | 10/2000 | Beauchesne | G06F 17/30336 |
| 6,134,564 A | 10/2000 | Listou | |
| 6,286,017 B1 * | 9/2001 | Egilsson | G06F 8/34 715/207 |
| 6,313,848 B1 | 11/2001 | Hoag | |
| 6,349,315 B1 * | 2/2002 | Sonoyama | G06F 17/246 715/209 |
| 6,373,504 B1 * | 4/2002 | Nielsen | G06F 7/22 707/999.003 |
| 6,411,959 B1 | 6/2002 | Kelsey | |
| 6,626,959 B1 | 9/2003 | Moise | |
| 6,684,216 B1 * | 1/2004 | Duliba | G06F 17/30595 707/694 |
| 6,691,281 B1 | 2/2004 | Sorge et al. | |
| 7,146,381 B1 | 12/2006 | Allen et al. | |
| 7,165,214 B2 | 1/2007 | Ishizaka | |
| 7,509,320 B2 | 3/2009 | Hess | |
| 7,565,613 B2 | 7/2009 | Forney | |
| 7,647,551 B2 | 1/2010 | Vigesaa | |
| 7,693,860 B2 | 4/2010 | Babanov et al. | |
| 8,108,431 B1 | 1/2012 | Guner et al. | |
| 8,429,518 B2 * | 4/2013 | Machalek | G06Q 10/10 715/212 |
| 8,718,364 B2 | 5/2014 | Enomoto | |
| 8,990,675 B2 | 3/2015 | Folting et al. | |
| 2003/0093362 A1 | 5/2003 | Tupper | |
| 2004/0049730 A1 | 3/2004 | Ishizaka | |
| 2004/0103365 A1 | 5/2004 | Cox | |
| 2004/0117358 A1 | 6/2004 | von Kaenel et al. | |
| 2005/0055369 A1 * | 3/2005 | Gorelik | G06F 17/30292 |
| 2005/0149911 A1 | 7/2005 | Nadon et al. | |
| 2005/0246360 A1 | 11/2005 | Tanny | |
| 2006/0026137 A1 * | 2/2006 | Sattler | G06F 17/246 |
| 2006/0117051 A1 | 6/2006 | Chin | |
| 2006/0117057 A1 | 6/2006 | Legault et al. | |
| 2006/0173862 A1 | 8/2006 | Sauermann | |
| 2006/0184410 A1 | 8/2006 | Ramamurthy | |
| 2007/0061369 A1 | 3/2007 | Folting et al. | |
| 2007/0061746 A1 | 3/2007 | Folting et al. | |
| 2007/0073697 A1 | 3/2007 | Woods | |
| 2007/0150385 A1 | 6/2007 | Ode | |
| 2007/0179959 A1 * | 8/2007 | Sharma | G06N 5/003 |
| 2007/0266331 A1 * | 11/2007 | Bicker | G06F 17/245 715/764 |
| 2008/0016041 A1 * | 1/2008 | Frost | G06F 17/246 |
| 2008/0046803 A1 | 2/2008 | Beauchamp et al. | |
| 2009/0018996 A1 | 1/2009 | Hunt et al. | |
| 2009/0044089 A1 | 2/2009 | Gur | |
| 2009/0049080 A1 | 2/2009 | Nadon et al. | |
| 2009/0182702 A1 | 7/2009 | Miller | |
| 2009/0228776 A1 | 9/2009 | Folting et al. | |
| 2009/0254572 A1 | 10/2009 | Redlich et al. | |
| 2009/0276692 A1 | 11/2009 | Rosner | |
| 2010/0205521 A1 | 8/2010 | Folting | |
| 2010/0228752 A1 | 9/2010 | Folting | |
| 2011/0010324 A1 | 1/2011 | Bolivar et al. | |
| 2011/0238555 A1 | 9/2011 | Rosenthal | |
| 2012/0096389 A1 | 4/2012 | Flam et al. | |
| 2012/0110515 A1 | 5/2012 | Abramoff et al. | |
| 2012/0210251 A1 | 8/2012 | Abrams et al. | |
| 2013/0080930 A1 | 3/2013 | Johansson | |
| 2013/0086459 A1 | 4/2013 | Folting et al. | |
| 2013/0086460 A1 | 4/2013 | Folting et al. | |
| 2013/0132861 A1 | 5/2013 | Kienzle et al. | |

FOREIGN PATENT DOCUMENTS

| | | |
|---|---|---|
| CN | 102067117 A | 5/2011 |
| EP | 1286284 A1 | 2/2003 |
| JP | 2001218160 A | 8/2001 |
| JP | 2003050964 A | 2/2003 |
| JP | 2004102400 A | 4/2004 |
| JP | 2005346717 A | 12/2005 |
| JP | 2006513560 A | 4/2006 |
| JP | 2006318113 A | 11/2006 |
| JP | 2009508219 A | 2/2009 |
| JP | 2009516265 A | 4/2009 |
| RU | 2417421 C2 | 4/2011 |
| RU | 2421797 C2 | 6/2011 |
| WO | 2007032913 A1 | 3/2007 |
| WO | 2010098958 A1 | 9/2010 |

OTHER PUBLICATIONS

Stinson, et al., "Microsoft Office Excel 2003 Inside Out, Analyzing Data with Pivot Table Reports", In Microsoft Office Excel 2003, Jan. 1, 2003, 8 Pages.

"Second Office Action Issued in Chinese Patent Application No. 201210377077.1", dated Jul. 9, 2015, 9 Pages.

"Third Office Action and Search Report Issued in Chinese Application No. 201210377077.1", dated Dec. 17, 2015, 11 Pages.

Chinese Fourth Office Action Issued in Chinese Patent Application No. 201210378724.0, dated Jan. 27, 2016, 6 Pages. With english Translation.

Chinese Notice of Allowance Issued in Chinese Patent Application No. 201210378724.0, dated Mar. 7, 2016, 4 Pages. With English Translation.

Chinese Notice of Allowance Issued in Application No. 201210377077.1, dated Apr. 5, 2016, 4 Pages.

Chinese Second Office Action Issued in Chinese Patent Application No. 201210378724.0, dated Jul. 17, 2015, 9 Pages. With English Translation.

Chinese Third Office Action Issued in Chinese Patent Application No. 201210378724.0, dated Oct. 23, 2015, 13 Pages. With english Translation.

Mexico Notice of Allowance Issued in Application No. MX/a/2014/004163, dated Apr. 30, 2016, 2 Pages.

Mexico Notice of Allowance Issued in Application No. MX/a/2014/004167, dated Mar. 8, 2016, 2 Pages.

Russian Office Action Issued in Patent Application No. 2014113086, dated Jun. 23, 2016, 5 Pages. Without English Translation.

Russian Office Action Issued in Patent Application No. 2014113089, dated Jun. 28, 2016, 6 Pages. Without English Translation.

"Office Action Issued in Japanese Patent Application No. 2014-534678", dated Oct. 4, 2016, 6 Pages.

Notice of Allowance Issued in Japanese Patent Application No. 2014-534673, dated Nov. 22, 2016, 4 Pages.

(56) References Cited

OTHER PUBLICATIONS

International Search Report and Written Opinion for PCT/US2012/058637 dated Mar. 15, 2013.
International Search Report and Written Opinion for PCT/US2012/058667 dated Mar. 28, 2013.
Johnson, Steve. Excerpts of "Microsoft Excel 2010 on Demand," Publishing Date: Jun. 22, 2010.
Jones, Brian; Document Assembly Solution for SpreadsheetML, Nov. 4, 2008, 8 pages.
"Just-in-time Learning-Excel2010 Marketing Strategy and Analysis Practice Treasure", In Heng Shengjie Information Science Press, Jan. 1, 2011, 10 Pages.
Lambert et al., excerpts from "Microsoft Access 2010 Step by Step," Copyright Date: Jul. 13, 2010.
Non-Final Office Action for U.S. Appl. No. 13/252,412 dated Feb. 19, 2013.
Non-Final Office Action for U.S. Appl. No. 13/252,450 dated Mar. 7, 2013.
Final Office Action for U.S. Appl. No. 13/252,450 dated Oct. 3, 2013.
Final Office Action for U.S. Appl. No. 13/252,412 dated Oct. 4, 2013.
Non-Final Office Action for U.S. Appl. No. 13/252,450 dated May 20, 2014.
Non-Final Office Action for U.S. Appl. No. 13/252,412 dated Jun. 17, 2014.
Notice of Allowance for U.S. Appl. No. 13/252,450 dated Nov. 17, 2014.
Notice of Allowance for U.S. Appl. No. 13/252,412 dated Feb. 20, 2015.
OLAP and OLAP Server Definitions, OLAP Council copyright 1995, 9 pages.
Oldenburg, Michael. Excerpts of "Using Microsoft OneNote 2010," Publishing Date: Sep. 6, 2011.
Racheria et al. Excerpts from "IBM System Storage D53500 Introduction and Implementation Guide," Copyright Date: May 20, 2011.
Technical Overview of Information Bridge Framework, MSDN Microsoft, published May 2004, 16 pages.
Wang, Haibo, "Word/Excel 2007, Efficient Office Operation, from Beginner to Master", In 331 China Railway Publishing House, Apr. 30, 2009, pp. 322-331.
What is spreadsheet?, accessed at http://www.webopedia.com/TERM/S/spreadsheet.html, accessed on Aug. 11, 2011, 2 pages Copyright Date: 2011.
"First Office Action and Search Report Issued in Chinese Patent Application No. 201210377077.1", dated Dec. 26, 2014, 12 Pages.
"First Office Action and Search Report Issued in Chinese Patent Application No. 201210378724.0", dated Feb. 6, 2015, 15 Pages.
Australian Office Action Issued in Patent Application No. 2012318666, dated Apr. 18, 2017, 4 Pages.
Australian Office Action Issued in Patent Application No. 2012318666, dated May 17, 2017, 4 Pages.
Japanese Notice of Allowance Issued in Japanese Patent Application No. 2014-534678, dated May 22, 2017, 4 Pages.
Australian Notice of Allowance Issued in Patent Application No. 2012318650, dated Apr. 21, 2017, 3 Pages.
Australian Office Action Issued in Patent Application No. 2012318666, dated Mar. 17, 2017 3 Pages.
Australian Office Action Issued in Patent Application No. 2012318650, dated Mar. 17, 2017 3 Pages.
European Supplementary Search Report Issued in Patent Application No. 12838253.8, dated Jun. 30, 2015, 9 Pages.
Book "1C Enterprise Version 8.0 Configuration "Trade Management", Edition 10.2 of the Description", Moscow, Firm "1C", 2004; No English Translation, 13 pages.
Russian Notice of allowance Issued in Patent Application No. 2014113089, dated Feb. 21, 2017, 15 Pages. With English Translation.
Japanese Office Action Issued in Japanese Patent Application No. 2014-534678, dated Feb. 10, 2017, 6 Pages. With Eng Trans.
Russian Notice of allowance Issued in Patent Application No. 2014113086, dated Feb. 15, 2017, 14 Pages. With English Translation.
"Office Action Issued in Australian Patent Application No. 2012318666", dated Oct. 3, 2017, 4 Pages.

\* cited by examiner

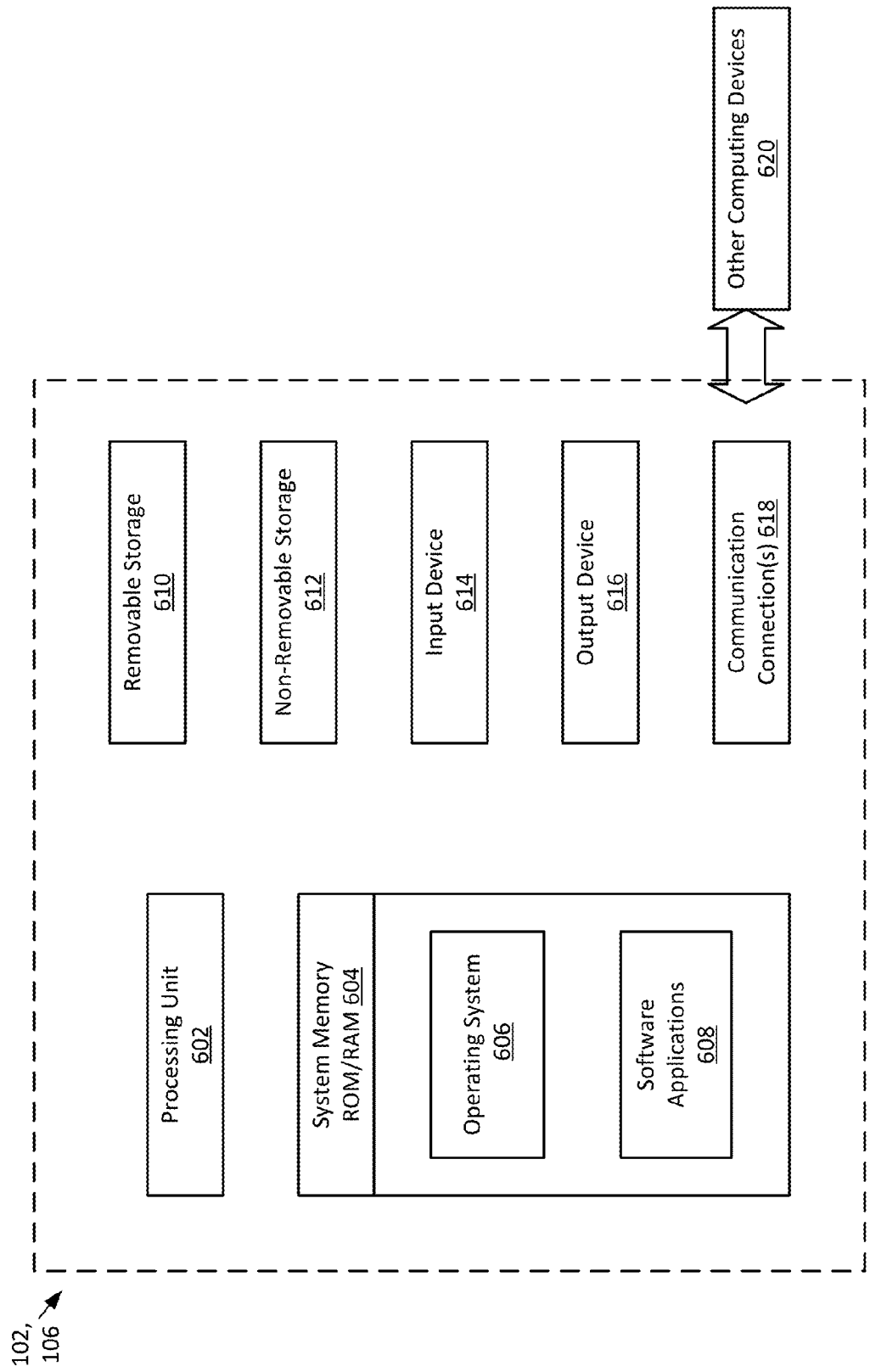

AUTOMATIC RELATIONSHIP DETECTION FOR SPREADSHEET DATA ITEMS

CROSS-REFERENCE TO RELATED APPLICATION

This application is a continuation of U.S. patent application Ser. No. 13/252,450, filed Oct. 4, 2011, entitled AUTOMATIC RELATIONSHIP DETECTION FOR SPREADSHEET DATA ITEMS, and now U.S. Pat. No. 8,990,675, which is hereby incorporated by reference in its entirety.

BACKGROUND

Data summary tables in spreadsheets can be used to analyze large amounts of data. A data summary table provides an efficient way to display and summarize data that is supplied by a database program or that is in a data listing of a spreadsheet. A user can select fields of the data to include within filter regions, row, column, or data regions of the data summary table and can choose aggregation functions such as the sum, variance, count, and standard deviation to be displayed for selected data fields. Data in a database that can be queried from within a spreadsheet program, or spreadsheet data including lists, can be analyzed in a data summary table.

With spreadsheets that include a significant amount of data, it can be difficult for the user to select the desired data upon which to be included in such reports as data summary tables. For example, the volume of data provided across one or more largely unstructured spreadsheets can overwhelm the user, making it difficult to find the pieces of data relevant for a specific reporting scenario.

SUMMARY

In one aspect, a system for creating a report in a spreadsheet includes: a central processing unit; and a memory encoding instructions that, when executed by the central processing unit, cause the central processing unit to create: a data source module programmed to identify tables associated with the spreadsheet; a relationship module programmed to analyze the tables and identify relationships between the items; and a display module programmed to display the relationships between the tables.

In another aspect, a method for identifying relationships between data items in a spreadsheet, the method comprising: identifying, by a computing device, tables associated with the spreadsheet; allowing a user to add one of the tables to a data summary table in the spreadsheet; analyzing the added table to determine a relationship between the added table and other tables in the data summary table; and when the added table is unrelated to the other tables in the data summary table, automatically identifying a relationship between the added table and the other tables in the data summary table.

In yet another aspect, a method for identifying relationships between dimensions in a data summary table of a spreadsheet, the method comprising: allowing a user to add a table to the data summary table in the spreadsheet, the table including a data region defined in the spreadsheet; analyzing columns associated with the table to determine a relationship between the dimensions and other tables in the data summary table; when the added table is unrelated to other tables in the data summary table: notifying a user of a need to define the relationship when the added table is added to the data summary table; and using heuristics to automatically identify the relationship between the table and the other tables in the data summary table; displaying the relationship between the added table and the other tables in the data summary table.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

FIG. 8 shows example components of computing devices shown in FIG. 1.

DETAILED DESCRIPTION

The present application is directed to systems and methods for automatically detecting and suggesting relationships between data regions in a spreadsheet application. In examples described herein, relationships between data regions are identified and presented to the user to allow the user to more easily combine data into a single usable report.

Figure 1:
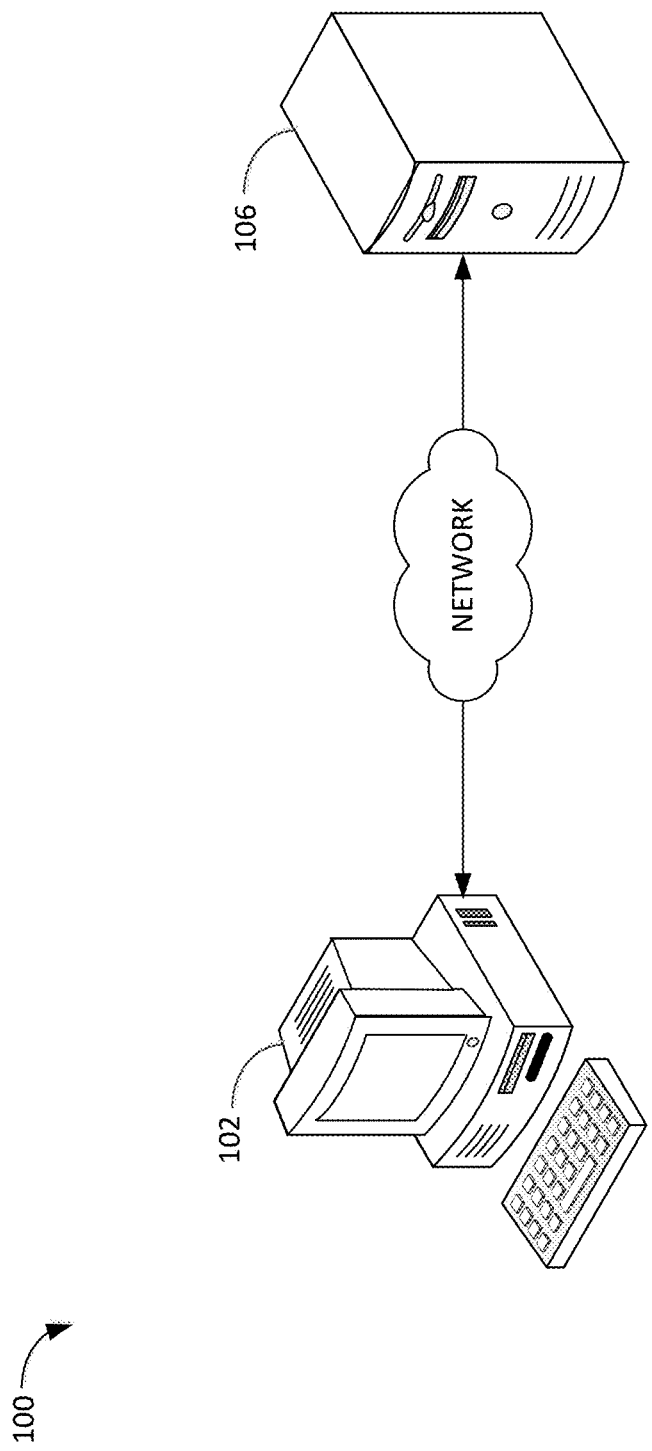
FIG. 1 shows an example system for generating a report in a spreadsheet program.

FIG. 1 shows an example system 100 that supports the generation of one or more reports based upon data provided in a spreadsheet application. The system 100 includes a client computer 102 and a server computer 106. The client computer 102 is connected to the server computer 106 across a network, typically a corporate Intranet or the Internet. More or fewer client computers, server computers or other computing devices may be used.

As described further below, the client computer 102 can connect to the server computer 106 to obtain data, such as a spreadsheet file. The client computer 102 can execute a native a spreadsheet application on the client computer 102 to manipulate the spreadsheet file. In another example, the client computer 102 can utilize one or more applications hosted on the server 106 to access and manipulate the spreadsheet file. Other configurations are possible.

Figure 2:
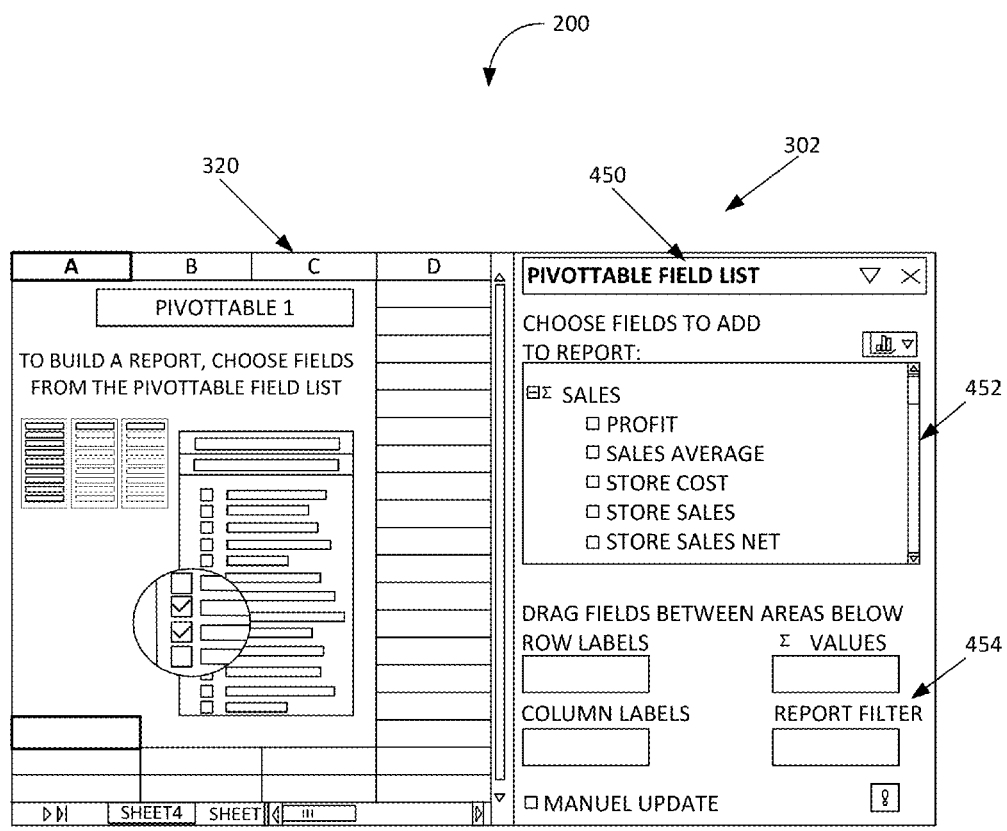
FIG. 2 shows an example pivot table in a spreadsheet.

Referring now to FIG. 2, an example program 200 is shown. In this example, the program 200 is Microsoft's EXCEL spreadsheet software program running on a computer system, such as the computer system 100 described above. The program 200 includes a spreadsheet with an example list of data.

A user can create one or more reports based on the data within the spreadsheet. In some examples described herein, the report can be a data summary table. However, in other examples, the report can simply be another "regular" table. For example, the systems and methods described herein can be used to suggest certain columns for a table created by the user based on associations identified with other tables in the spreadsheet.

Figure 3:
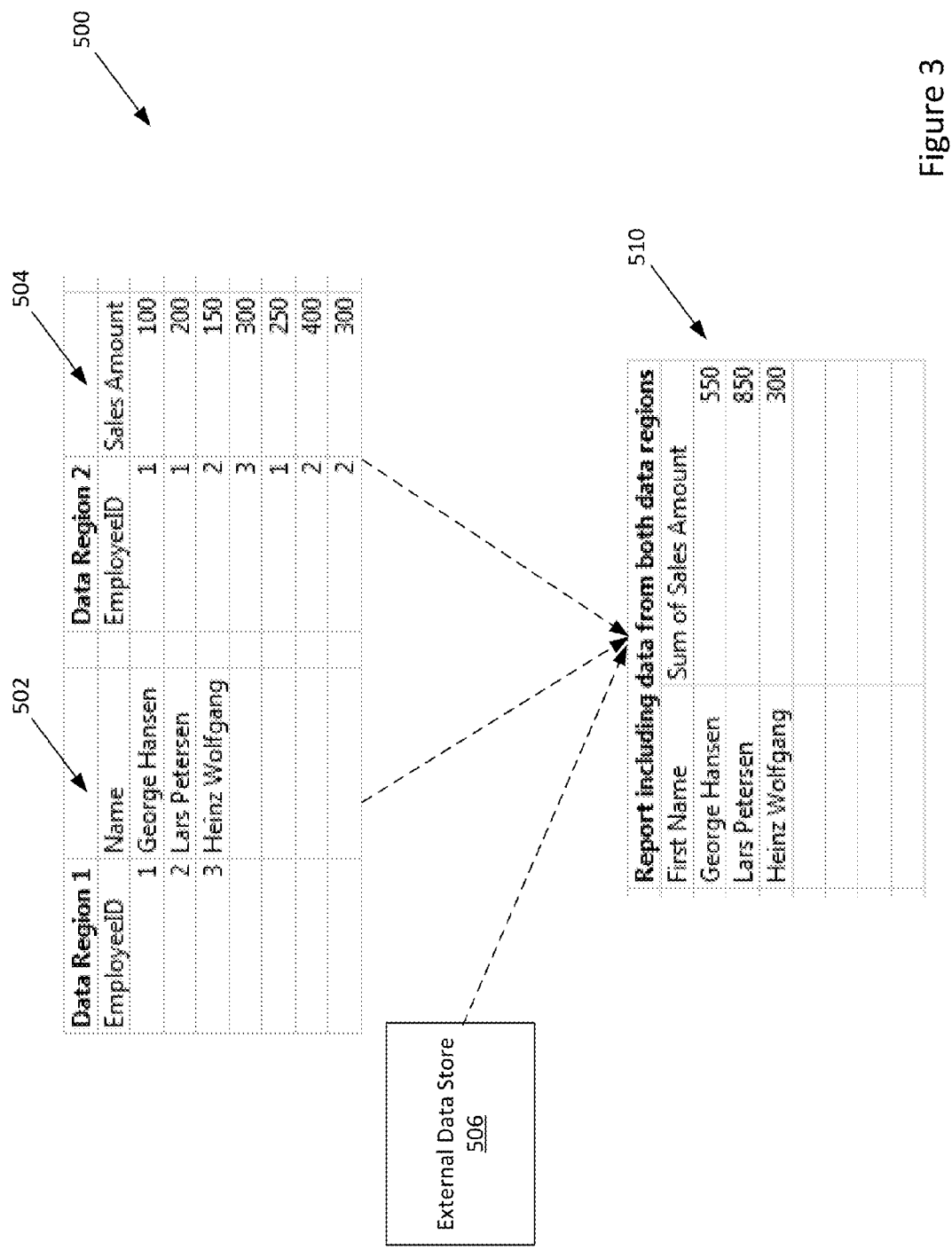
FIG. 3 shows example data regions used to generate a pivot table in a spreadsheet.

For example, an example user interface 302 of program 200 is shown. The user interface 302 includes an initial data summary table 320 (The data summary table 320 is blank in FIG. 3). The data summary table 320 can be created from data from various sources. In one example as shown in FIG. 3, the data summary table 320 can be created from data provided within the spreadsheet file or from one or more external data stores.

The user interface 302 of the program 200 also includes an example task pane 450 that can be used to create and modify the data summary table 320. For example, the task pane 450 includes a list of the data fields from data associated with the spreadsheet file. The user can select and deselect fields from the task pane 450 to create the data summary table 320.

The task pane 450 generally includes a field pane 452 and a layout pane 454. The field pane 452 includes a list of the data fields available in the spreadsheet. In these examples, the data fields include tables, with each table having one or more columns that can be added to the report. When a data field in the list is added to the layout pane 454 as described below, the checkbox associated with the data field is checked.

The layout pane 454 includes a plurality of zones that represent aspects of the data summary table 320 that is created using the task pane 450. For example, the layout pane 454 includes a row zone, a column zone, a value zone, and a filter zone. The row zone defines the row labels for the resulting data summary table 320. The column zone defines the column labels for data summary table 320. The value zone identifies the data that is summarized (e.g., aggregation, variation, etc.) on data summary table 320. The Filter zone allows for the selection of filtering that is applied to all other fields in the other zones.

One or more of the data fields from field pane 452 are added to one or more of the zones of layout pane 454 to create and modify the data summary table 320. In the example shown, the user can click, drag, and drop a data field from the list in the field pane 452 to one of the zones of the layout pane 454 to add a field to the data summary table 320.

Referring now to FIG. 3, the data used to create a report, such as the data summary table 320, can come from multiple sources. The sources of data can be internal to a spreadsheet, as well as external.

For example, a spreadsheet 500 shown in FIG. 3 includes two internal data regions 502 and 504. Data regions are defined sets of data having at least two dimensions, such as rows and columns. For example, the data region 502 includes columns EmployeeID, Name, and rows 1-3. Similarly, the data region 504 includes columns EmployeeID, Sales Amount, and rows 1-7.

In these examples, a plurality of data regions can be included at multiple locations within a spreadsheet, such as on same or different sheets within the spreadsheet. As noted below, data can also be incorporated from external sources.

In this example, the program 200 is programmed to analyze the data regions 502 and 504 and to automatically determine relationships between the regions. For example, the program determines that the EmployeeID data in both regions are compatible using various heuristics described further below.

In these examples, a relationship is a link created between two data regions (sometimes referred to as "tables") based on matching data values. These relationships can include a one-to-one relationship and/or a one-to-many relationship. For example, a single value in a table can correspond to multiple values in a look-up or related table. Relationships allow the program to look-up and summarize data in both tables simultaneously.

Upon this detection, the program 200 creates a relationship between the two data regions 502, 504 and allows the user to easily create a report by simply selecting the fields in a user interface. For example, the data fields associated with the data regions 502, 504 can be clustered in the user interface so that the user can easily identify the relationships between the data regions. Additional details about example user interfaces for this purpose are found in U.S. patent application Ser. No. 13/252,412, titled "Automatic Scoping Of Data Entities," filed on even date herewith, the entirety of which is hereby incorporated by reference.

One example of a report that can be generated after the relationship between the data regions 502, 504 is detected is a report 510 on the spreadsheet 500. In this example, the report 510 is a data summary table, such as a pivot table, generated using the data from the data regions 502, 504. To create the report 510, the user selects desired data fields from the data regions 502, 504 and the external data store 506 in a manner similar to that described in FIG. 2.

In addition to the data regions 502, 504 provided in the spreadsheet 500, data can also be incorporated from external data stores into the spreadsheet 500. For example, an external data store 506 is shown in FIG. 3. Examples of such external data stores include OLAP and non-OLAP data sources. Data from this external data store 506 is incorporated into the spreadsheet 500. Based on information about this external data store 506, relationships between the data in the external data store 506 and data regions 502, 504 within the spreadsheet 500 can be identified, as described further below.

In some examples, the number of available data fields provided in the data regions and external data stores from which the user can select becomes voluminous. In such scenarios, it can be difficult for the user to review the available data fields and select the desired fields for inclusion in a report.

Figure 4:
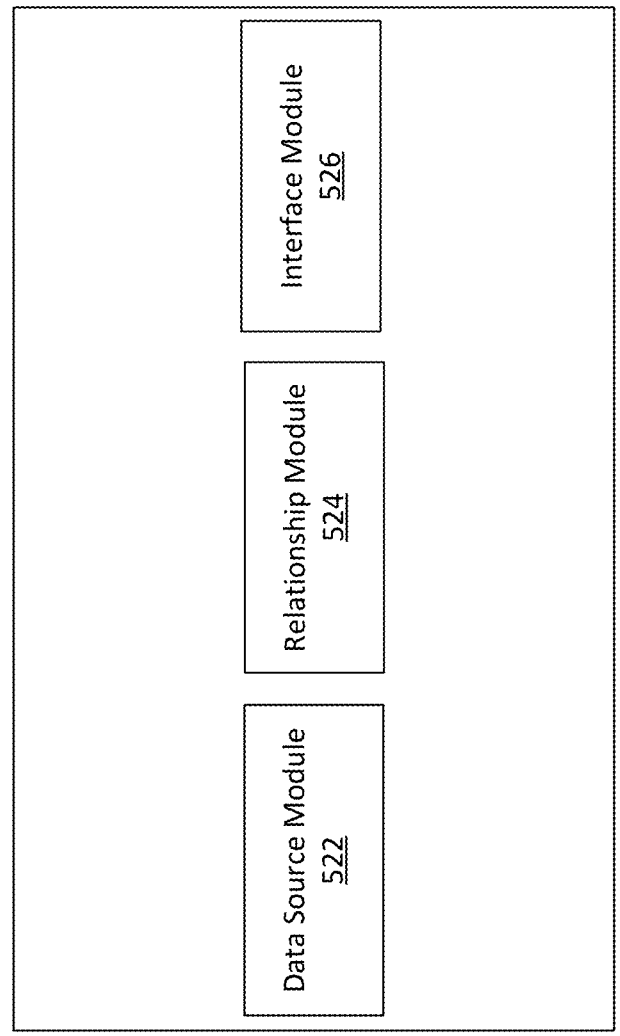
FIG. 4 shows example modules of a client computing device of the system of FIG. 1.

Referring now to FIG. 4, logical modules of the client computer 102 are shown. These modules include a data source module 522, a relationship module 524, and an interface module 526. In these examples, the modules 522, 524, 526 are executed in conjunction with the spreadsheet application that allows the user to manipulate data within spreadsheet files. The modules 522, 524, 526 of the client computer 102 function to identify relationships between the data in the spreadsheet so that the user can more easily identify relevant fields that the user may want to select when creating a report.

The data source module 522 identifies all data sources associated with a particular file, such as a spreadsheet file. This can include internal data regions defined on one or more sheets of the spreadsheet file. This can also include data from external data stores. Such external data stores can include data that is referenced from within the spreadsheet, such as external data that has been incorporated into the spreadsheet file. The data source module 522 provides all of the data sources to the relationship module 524 for analysis.

The relationship module 524 determines which, if any, of the data sources within a spreadsheet are related. For example, if the user is creating a report, such as a pivot table, the relationship module 524 determines uses various heuristics to analyze all of the data regions and external data stores that have been incorporated into the spreadsheet to determine any relationships therebetween.

For example, the program uses heuristics to examine the data, either data in the spreadsheet grid or data from any external data source which the user has imported into the spreadsheet application, and based on that suggest related data entities in different data regions. The spreadsheet application then stores information on these relationships and other spreadsheet features will now automatically leverage these relationships, allowing the user to create a report which includes data from multiple different data regions.

Some examples of the heuristics that can be used to identify associations include one or more of the following:
  column name matching (e.g., columns with similar captions);
  value matching, such as one column with unique values in the primary key table and a column with repeated values in the foreign key table but where the distinct set of values exist in the primary key column;
  data type matching (e.g., date or currency fields);
  fuzzy value matching (e.g., "CA" matching "California"); and
  using mapping tables to produce needed identifiers in one table to create a relationship to another table which already has a column with those identifiers.

Figure 5:
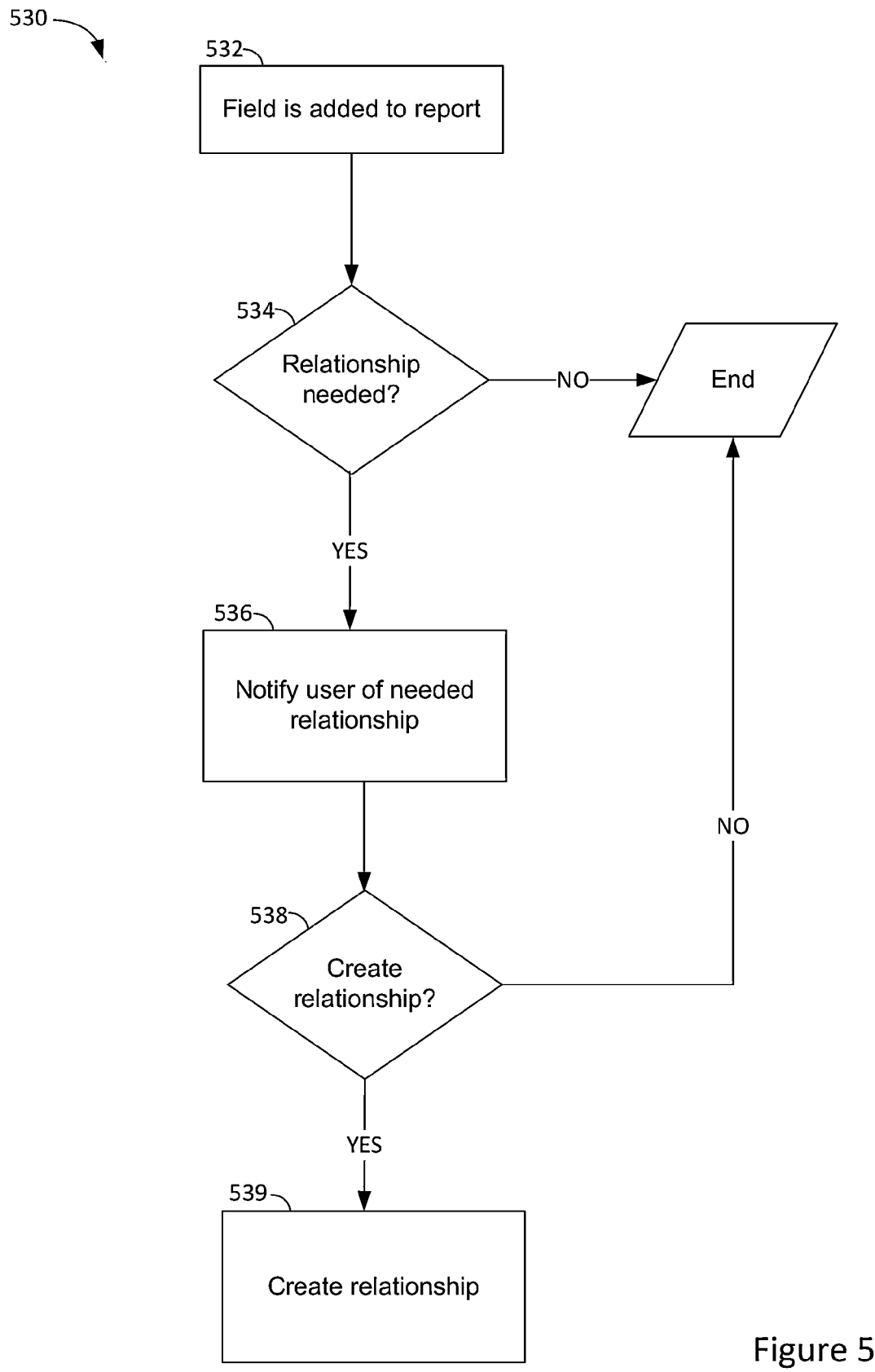
FIG. 5 shows an example method for identifying a relationship between two or more tables in a report.

For example, referring to FIG. 5, in one scenario, the relationship between two or more tables is created when the user adds data fields from unrelated tables to a report, such as a data summary table.

In this example, a method 530 begins when the user adds a field to the report at operation 532. Next, at operation 534, a determination is made regarding whether or not a relationship is needed because, for example, the field is unrelated to the fields already included in the table. If a relationship is not needed (i.e., the field is already related in some manner), the field is added and the method ends.

However, if a relationship is needed, control is instead passed to operation 536, and the user is notified that a relationship may be missing. One example method for such a notification is providing an info-bar within the user interface to notify the user that the relationship is missing (e.g., "Relationships between tables may need to be created.").

Next, at operation 538, a determination is made regarding whether or not the user wants to create a relationship for the newly-added field. If not, the method ends, and user may be prompted again for the need to provide a relationship the next time the user modifies the report. If so, control is instead passed to operation 539. At operation 539, the relationship between the newly-added field and the fields already included in the report is determined. In one example, the relationship can be automatically determined by using one or more of the heuristics described above. In another example, the relationship can be manually defined.

Figure 6:
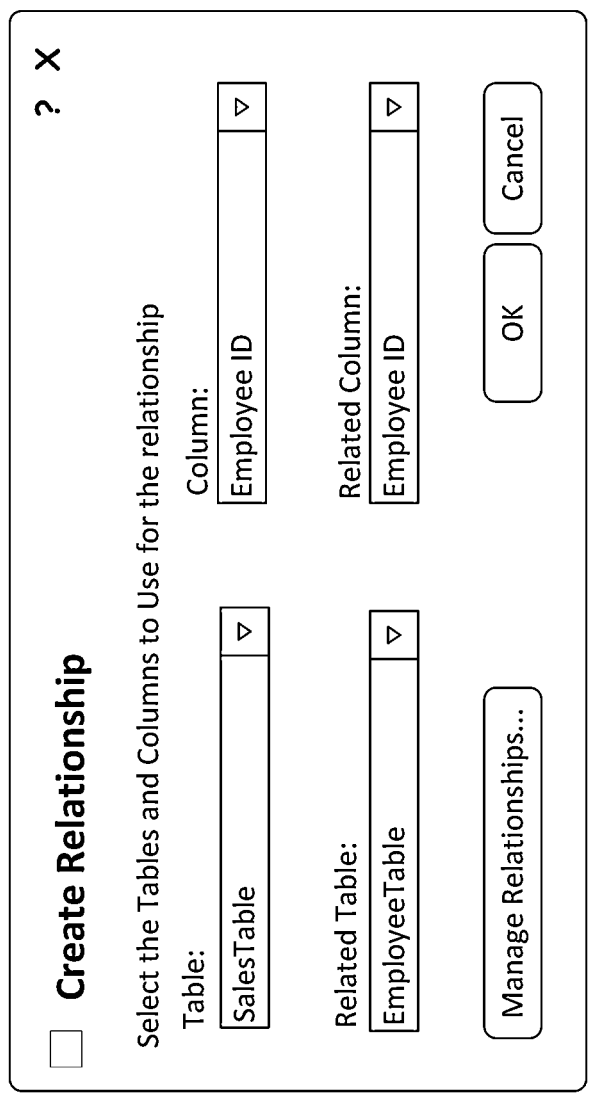
FIG. 6 shows an example wizard to manually identify a relationship between two or more tables in a report.

For example, referring now to FIG. 6, an example relationship wizard 540 is illustrated. In this wizard 540, the user can manually define the relationship between fields in different tables. In this example, the field Employee ID is related for tables SalesTable and EmployeeTable.

The relationships defined by the relationship module 524, whether automatically created by the program or defined manually by the user, can be persisted throughout the creation of the report. In some examples, the relationships can also be persisted through creation of other reports within the spreadsheet so that the program and/or user do not have to redefine the relationships each time the data fields in the spreadsheet are used.

Referring again to FIG. 4, the interface module 526 presents the available data fields from the data regions and external data stores in the spreadsheet to the user for inclusion in the report. In this example, the interface module 526 indicates relationship between the data sources to the user in the interface. These relationships can be manifest in several manners. In one example, when the user selects a table, the interface can present only that table and any other tables that are related to the selected table. In another example, the tables can be clustered to identify the relationships.

As noted above, in addition to defining relationships among data fields from tables within the spreadsheet, the program can define relationships with data from external sources, such as external data stores. In this scenario, the relationship module 524 is programmed to analyze the data from an external data store and provide any relationships between that data and any other data contained in the spreadsheet.

Figure 7:
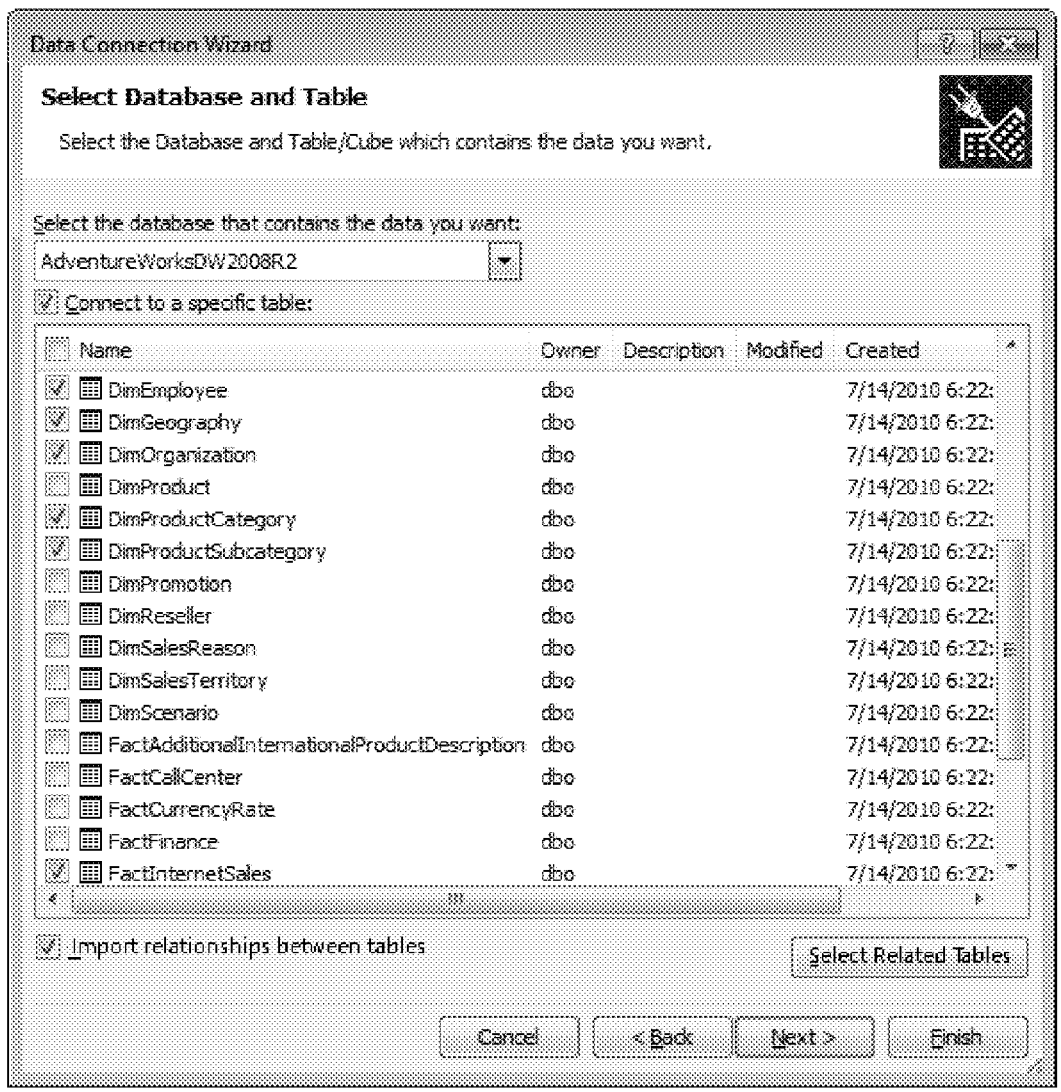
FIG. 7 shows an interface to identify a relationship between data from an external data store and one or more tables in a report.

For example referring to FIG. 7, an example data connection wizard 550 is shown. In this example, the data connection wizard 550 allows the user to select tables which are directly related to the currently selected table(s) in the wizard. In this example, the external data store "AdventureWorksDW2008R2" is selected in the wizard 550, and the user can select specific tables within the spreadsheet to relate to the database (e.g., DimEmployee is selected). This selection can be done manually, by the user in the wizard 550), or it can be done automatically by the program using the heuristics described above. In other examples, if the external data source has relationships already defined between its tables, those can be imported along with the data from the external data source and used in the spreadsheet application along with any other relationships created there.

For example, the program can access schema information about the external data store that allows the program to ascertain relationships between tables. This schema (e.g., in the form of an XML file) can relate fields within the external data store that is imported, as well as other data in other external data stores. The program leverages this information to relate data fields automatically for the user.

With reference to FIG. 8, example components of the client computer 102 and the server computer 106 are shown. In example embodiments, the client computer 102 and the server computer 106 are computing devices. The client computer 102 and server computer 106 can include input/output devices, a central processing unit ("CPU"), a data storage device, and a network device. The client computer 102 can also be a mobile computing device, such as a laptop, tablet, convertible, or other handheld device like a smartphone or cellular telephone. The server computer 106 can also be incorporated as one or more server computers in a network of servers. In such a scenario, the network can provide a cloud computing platform in which one or more applications and data are hosted for clients connecting to the cloud computing platform. The discussion below regarding the server computer 106 also applies to the components of the client computer 102.

In a basic configuration, the server computer 106 typically includes at least one processing unit 602 and system memory 604. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of a server, such as the Microsoft SharePoint® Server 2010 collaboration server, from Microsoft Corporation of Redmond, Wash. The system memory 604 may also include one or more software applications 608 and may include program data.

The server computer 106 may have additional features or functionality. For example, server computer 106 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 6 by removable storage 610 and non-removable storage 612. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server computer 106. Any such computer readable storage media may be part of server computer 106. Server computer 106 may also have input device(s) 614 such as keyboard, mouse, pen, voice input device, touch input device, etc. Output device(s) 616 such as a display, speakers, printer, etc. may also be included.

Consistent with embodiments of the present disclosure, the input device(s) 614 may comprise any motion detection device capable of detecting the movement or gesture of a user. For example, the input device(s) 614 may comprise a Kinect® motion capture device, from Microsoft Corporation, comprising a plurality of cameras and a plurality of microphones.

The server computer 106 may also contain communication connections 618 that allow the device to communicate with other computing devices 620, such as over a network in a distributed computing environment, for example, an intranet or the Internet. Communication connections 618 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Embodiments of the present disclosure may be practiced via a system-on-a-chip (SOC) where each or many of the components illustrated in FIG. 6 may be integrated onto a single integrated circuit. Such an SOC device may include one or more processing units, graphics units, communication units, system virtualization units and various application functionality all of which are integrated (or "burned") onto the chip substrate as a single integrated circuit. When operating via an SOC, the functionality, described above, with respect to the present disclosure may be operated via application-specific logic integrated with other components of the computing devices 102 and 106 on the single integrated circuit (chip).

The various embodiments described above are provided by way of illustration only and should not be construed to limiting. Various modifications and changes that may be made to the embodiments described above without departing from the true spirit and scope of the disclosure.

What is claimed is:

1. A system for creating a report in a spreadsheet, the system comprising:
   a central processing unit; and
   a memory encoding instructions that, when executed by the central processing unit, cause the central processing unit to create:
      a data source module programmed to identify tables associated with the spreadsheet; and
      a relationship module programmed to analyze the tables and identify related tables that have an undefined relationship, the relationship module defining a relationship for the related tables having the undefined relationship by using heuristics to automatically define the undefined relationship.

2. The system of claim 1, wherein the relationship module identifies the relationship when a table is added to the report.

3. The system of claim 2, wherein the system provides a notification of a need to define the relationship when the table is added to the report.

4. The system of claim 3, wherein the system allows manual identification of the relationship between the table and another table in the report.

5. The system of claim 1, wherein the report is a data summary table, and the tables each include one or more dimensions to be added to the data summary table.

6. The system of claim 1, wherein the relationship is persisted throughout use of the tables in the spreadsheet.

7. The system of claim 1, wherein one of the tables is a data region defined in the spreadsheet.

8. The system of claim 7, wherein the data region includes a plurality of fields.

9. The system of claim 1, wherein one or more of the tables is stored on an external data store.

10. The system of claim 1, wherein the heuristics include one or more of column name matching, value matching, data type matching, fuzzy value matching and using mapping tables.

11. A method for identifying a relationship between tables in a spreadsheet, comprising:
   identifying, by a computing device, tables associated with the spreadsheet;
   receiving a first table to add to a data summary table for the spreadsheet, wherein the relationship between the first table and a second table is undefined;
   determining whether the first table and the second table in the data summary table are related; and
   when the first table is related to the second table in the data summary table, defining the relationship between the first table and the second table in the data summary table, wherein defining the relationship between the first table and the second table in the data summary table includes using heuristics to automatically identify the relationship.

12. The method of claim 11, further comprising displaying the relationship between the first table and the second table in the data summary table.

13. The method of claim 12, further comprising manually defining the relationship between the first table and the second table in the data summary table.

14. The method of claim 11, further comprising providing a notification to define the relationship when the first table is added to the data summary table.

15. The method of claim 11, wherein each of the tables includes one or more columns to be added to the data summary table.

16. The method of claim 11, further comprising persisting the relationship throughout use of the tables in the spreadsheet.

17. The method of claim 11, wherein the first table and the second table are a data region defined in the spreadsheet.

18. The method of claim 17, wherein the data region includes a plurality of fields.

19. The method of claim 11, wherein the heuristics include one or more of column name matching, value matching, data type matching, fuzzy value matching and using mapping tables.

20. A computing device for identifying a relationship between tables in a spreadsheet, comprising:

a central processing unit; and
a memory encoding instructions that, when executed by the central processing unit, cause the computing device to:
identify tables associated with the spreadsheet;
receive a first table to add to a data summary table for the spreadsheet;
determining whether the relationship between the first table and a second table in the data summary table is undefined; and
if the relationship between the first table and the second table is undefined:
providing a notification to manually define the relationship; and
if the relationship is not manually defined, using heuristics to automatically define the relationship between the first table and the second table in the data summary table, wherein the heuristics include one or more of column name matching, value matching, data type matching, fuzzy value matching and using mapping tables.

* * * * *